UNITED STATES PATENT OFFICE.

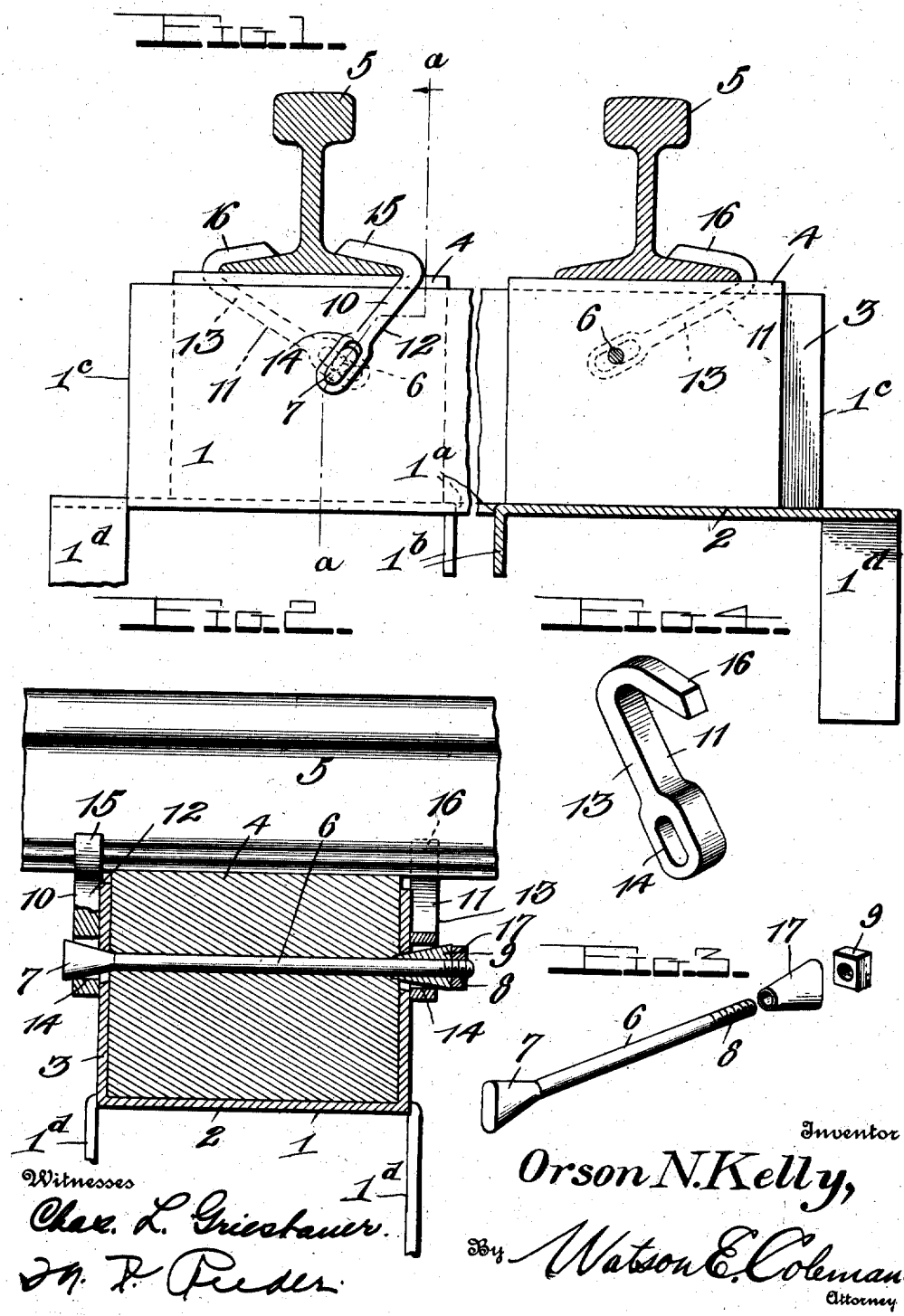

ORSON N. KELLY, OF SALT LAKE CITY, UTAH.

RAILWAY-TIE.

995,541. Specification of Letters Patent. Patented June 20, 1911.

Application filed December 29, 1910. Serial No. 599,811.

*To all whom it may concern:*

Be it known that I, ORSON N. KELLY, a citizen of the United States, residing at Salt Lake City, in the county of Salt Lake and State of Utah, have invented certain new and useful Improvements in Railway-Ties, of which the following is a specification, reference being had to the accompanying drawings.

This invention is an improved channeled metallic railway tie combined with wooden blocks for supporting the rails and improved devices for fastening the blocks in the tie, and the rails on the blocks, the invention consisting in the construction, combination and arrangement of devices hereinafter described and claimed.

In the accompanying drawings—Figure 1 is partly an elevation and partly a longitudinal sectional view of a railway tie embodying my improvements, and showing the same in connection with a pair of rails supported on the tie. Fig. 2 is a transverse sectional view of the same on the plane indicated by the line $a$—$a$ of Fig. 1. Fig. 3 is a detail perspective view of one of the securing bolts showing the wedge shaped sleeve, and the nut detached therefrom. Fig. 4 is a similar view of one of the hook arms.

The tie 1 is made of iron or steel and is channel shaped comprising the bottom 2, and the side walls 3. Blocks 4 which are of wood and which support the rails 5, are placed in the tie at suitable points. The upper surfaces of the blocks are somewhat above the side walls of the tie. A securing bolt 6 extends transversely through each block 4 and through the side walls of the tie. The bolt is disposed some distance within the plane of the vertical center of the rail as indicated in Fig. 1 and one end of the bolt which projects beyond one side of the tie is provided with a wedge shaped head 7, the sides of which converge inwardly. The other end of the bolt is screw-threaded as at 8, and a nut 9 is provided to screw thereon. A pair of hook arms 10, 11 are used in connection with each securing bolt. The shank 12 of the hook arm 10 is somewhat shorter than the shank 13 of the hook arm 11 and is provided with an opening 14 for the reception of the wedge shaped head 7, and the bill 15 of said hook arm bears on the inner base flange of the track rail and is somewhat longer than the corresponding bill 16 of the hook arm 11, which bears on the outer base flange of the rail. The shank 13 of the hook arm 11, has an opening 14 in which is a wedge shaped sleeve 17 through which the bolt 6 extends, the said sleeve being movable longitudinally on the bolt by the nut 9 and hence when the nut is tightened, the wedge shaped sleeve tightens the hook arm 11 on the outer base flange of the rail, and at the same time the longitudinal movement of the bolt 6 causes the head 7 thereof to correspondingly tighten the hook arm 12 on the inner base flange of the rail. Hence the rail is firmly secured on the block and also to the tie and the block also is secured in the tie with the side walls of the tie firmly gripping the sides of the block, and should the block shrink at any time, the hook arms may be readily tightened on the rail by merely turning up the nut 9. Moreover, the hook arms may be adjusted as may be required to fit them to rails of various sizes, and as may be required for curves. The openings in the side walls of the tie correspond in shape with the wedge shaped head and sleeve of the bolt so that there is no tendency whatever of the bolt to turn. By locating the securing bolt at a point to one side of the plane of the vertical center of the rail, and nearer the inner side of the rail than the outer side thereof, the hook arm 12 is disposed at such an angle to the inner base flange of the rail that its bill 15 lies snugly on the upper side thereof, and the rail is held firmly against any tendency to turn under the action and stress of passing trains and moreover, the hook arms which grip both the inner and outer sides of the rails effectually prevent the rails from spreading.

My improved rail securing devices may be readily manufactured at slight cost, may be readily applied to and removed from a tie block and railway rail, and should any one of the parts become injured or broken, it may be readily replaced by another in a very short time and at minimum expense.

The tie is provided in its bottom preferably at a central point with an opening $1^a$, for draining water from the tie, and at opposite sides of the said opening are down-turned anchoring flanges $1^b$, which are integral with the bottom of the tie and are formed by down-turned portions thereof. At the ends of the tie the side walls are cut vertically as at $1^c$ to form portions $1^d$ which are turned downwardly and become embedded in the road bed and serves to firmly secure the tie against transverse movement on the road bed, the flanges 1ᵇ securing the tie against end-wise movement.

My improved tie, with its rail securing devices, is extremely simple, is very strong and durable, is cheap may be readily manufactured, is practicable, will operate efficiently, and its use greatly promotes safety, since overturning or spreading of the rails is prevented.

I claim:—

1. The combination of a hollow tie, a block therein, a securing bolt extending through the tie and block, and rail securing devices connected to the said bolt, said rail securing devices having openings for the bolt, said bolt having a wedge shaped head to engage the opening of one of said securing devices, a wedge shaped sleeve to engage the opening of the other securing device, and means to adjust said sleeve.

2. In combination with a hollow tie, a block therein, a rail on said block, a securing bolt extending through the block and the side walls of the tie, and provided at one end with a wedge shaped head, a hook arm engaging one base flange of the rail, and having an opening through which the said head of said bolt extends, a hook arm engaging the other base flange of the rail, and having an opening, a wedge shaped sleeve in said opening and fitted and movable on said bolt, and a nut on said bolt bearing against the outer end of said wedge shaped sleeve.

3. In combination with a hollow tie, and a block therein, a track rail bearing on said block, a securing bolt passing through said block and the side walls of the tie, and located to one side of the vertical plane of the center of said rail, hook arms connected to the said bolt and engaging the opposite base flange of the rail and means to adjust said hook arms.

4. A railway tie formed from a single piece of metal, and comprising a bottom and side walls, the bottom being provided with an opening, and downturned anchoring flanges at opposite sides of said opening, and being also provided at the ends of the tie with downturned anchoring flanges parallel with the side walls of the tie.

In testimony whereof I hereunto affix my signature in the presence of two witnesses.

ORSON N. KELLY.

Witnesses:
J. W. GARNER,
GEO. S. LIVINGSTON.